(12) United States Patent
Yokoi

(10) Patent No.: US 6,227,966 B1
(45) Date of Patent: May 8, 2001

(54) SIMULATION DEVICE FOR FOSTERING A VIRTUAL CREATURE

(75) Inventor: Akihiro Yokoi, Tokyo (JP)

(73) Assignees: Kabushiki Kaisha Bandai; Kabushiki Kaisha Wiz, both of Tokyo (JP)

( * ) Notice: Subject to any disclaimer, the term of this patent is extended or adjusted under 35 U.S.C. 154(b) by 0 days.

(21) Appl. No.: 08/909,672

(22) Filed: Aug. 12, 1997

Related U.S. Application Data

(63) Continuation-in-part of application No. 08/803,197, filed on Feb. 19, 1997, and a continuation-in-part of application No. 08/873,223, filed on Jun. 11, 1997.

(30) Foreign Application Priority Data

Mar. 31, 1997 (JP) .................................................... 9-096413

(51) Int. Cl.[7] ...................................................... A63F 9/24
(52) U.S. Cl. .................................. 463/1; 463/40; 703/11; 706/58; 446/143; 446/175
(58) Field of Search ........................... 463/40, 1; 706/58; 446/143, 175; 703/11

(56) References Cited

U.S. PATENT DOCUMENTS

| | | | |
|---|---|---|---|
| 2,185,190 | 1/1940 | Gorbea et al. | 46/141 |
| 2,669,063 | 2/1954 | Lang | 46/119 |
| 3,641,703 | 2/1972 | Tepper et al. | 46/232 |

(List continued on next page.)

FOREIGN PATENT DOCUMENTS

| | | | |
|---|---|---|---|
| 0 712 074 A2 | 5/1996 | (EP) | G06F/9/44 |
| 0 712 074 A3 | 4/1997 | (EP) | G06F/9/44 |
| 0768105A2 | 4/1997 | (EP) . | |

(List continued on next page.)

OTHER PUBLICATIONS

CyberLife. "Creatures". 1996–97. Publisher: Mindscape, Inc.*

Creatures Sells 100,000 Copies in Less Than 100 Days: http://csoon.com/issue30/p_mind1.htm. (Dec. 1996: shipping of "Creatures").*

About Petz: http://www.pfmagic.com/about/default.asp (2000).*

(List continued on next page.)

Primary Examiner—Valencia Martin-Wallace
Assistant Examiner—Chanda Harris
(74) Attorney, Agent, or Firm—Baker & McKenzie

(57) ABSTRACT

With a purpose of providing a simulation device for fostering a virtual creature where the virtual creature is disciplined, the virtual creature is grown and fostered when a player conducts a corresponding treatment in response to a call or a request from the displayed virtual creature, the simulation device is provided with mark display units for displaying treatments for fostering the virtual creature by marks, and key switches for inputting a corresponding treatment by selecting a specific mark from a plurality of marks, the simulation device is provided with a storing unit for storing control data for fostering the virtual creature and a control unit where, when a treatment for fostering the virtual creature is input by operating the key switches, the control data in correspondence thereto is read from the storing unit and a control for fostering the virtual creature is conducted based on the read control data, and the simulation device is further constituted by a detecting circuit for detecting a call from an external source, manifesting means for randomly manifesting an influencing creature effecting an adverse effect on the growth of the virtual creature and expelling means for expelling the influencing creature when a call from an external source is detected.

20 Claims, 10 Drawing Sheets

U.S. PATENT DOCUMENTS

| | | | |
|---|---|---|---|
| 3,992,807 | 11/1976 | Sapkus et al. | 46/119 |
| 4,869,701 | 9/1989 | Kawai et al. | 446/91 |
| 5,037,345 | 8/1991 | Nakayama | 446/297 |
| 5,295,889 | 3/1994 | Ejima | 446/91 |
| 5,390,937 | 2/1995 | Sakaguchi et al. | 273/434 |
| 5,393,071 | 2/1995 | Best | 273/434 |
| 5,395,242 | 3/1995 | Slye et al. | 434/43 |
| 5,396,225 * | 3/1995 | Okada et al. | 463/40 |
| 5,423,554 | 6/1995 | Davis | 273/437 |
| 5,462,275 | 10/1995 | Lowe et al. | 273/94 |
| 5,511,158 * | 4/1996 | Sims | 345/440 |
| 5,556,339 | 9/1996 | Cohen | 463/1 |
| 5,572,646 * | 11/1996 | Kawai et al. | 395/501 |
| 5,580,308 | 12/1996 | Nakamura | 463/7 |
| 5,754,740 * | 5/1998 | Fukuoka et al. | 706/58 |
| 5,966,526 * | 10/1999 | Yokoi | 703/11 |
| 6,031,549 * | 2/2000 | Hayes-Roth | 345/474 |

FOREIGN PATENT DOCUMENTS

| | | |
|---|---|---|
| 58-153985 | 9/1985 | (JP) . |
| 5-189403 | 7/1993 | (JP) . |
| 6-277365 | 10/1994 | (JP) . |
| 8-309032 * | 5/1995 | (JP) . |
| 7-261962 | 10/1995 | (JP) . |
| 7-281819 | 10/1995 | (JP) . |
| 7-98104 | 10/1995 | (JP) . |
| 7-98105 | 10/1995 | (JP) . |
| 7-98106 | 10/1995 | (JP) . |
| 7-325689 | 12/1995 | (JP) . |
| 2529573 | 6/1996 | (JP) . |
| 8-309032 | 11/1996 | (JP) . |

OTHER PUBLICATIONS

Norn History: http://www.creatures.co.uk/. (1998).*
"Tamawhat? Move over for some really cool virtual pets": http://www.torontocomputers.com/g–creat.html.*
Aquazone Desktop Virtual Reality User's Guide.
Sim Life User's Manual.
Princess Maker.
"Mathematical Entertainment" by Christopher Pöppe.
"Weird Creatures" by Thomas Feibel.
"A Chicken in Every Pocket", by Kevin Sullivan, Washington Post Foreign Service, p. A01, Jan. 25, 1997.
"Love Eggs", Tomorrow's Technology Today, Future Publishing Ltd., No. 8, p. 83, Jun. 1997.

* cited by examiner

SIMULATION DEVICE FOR FOSTERING A VIRTUAL CREATURE

REFERENCE TO RELATED APPLICATIONS

The present application is a continuation in part of Ser. No. 08/803,197 filed in the U.S. on Feb. 19, 1997, entitled, "BREEDING SIMULATION APPARATUS FOR VIRTUAL CREATURES," and Ser. No. 08/873,223 filed in the U.S. on Jun. 11, 1997, entitled, "SIMULATION DEVICE FOR FOSTERING A VIRTUAL CREATURE." These applications are incorporated herein by this reference.

BACKGROUND OF THE INVENTION

1. Field of the Invention

The present invention relates to a simulation device for fostering a virtual creature by conducting a treatment in response to a call from the virtual creature.

2. Description of Related Art

In recent years, various electronic game devices for raising a pet such as a dog or a cat in a predetermined screen, have been proposed and sold. There have been known conventional electronic game devices of this kind disclosed in, for example, Japanese Unexamined Patent Publication No. JP-A-7-261962 or Japanese Unexamined Patent Publication No. JP-A-7-281819.

According to the conventional example disclosed in Japanese Unexamined Patent Publication No. JP-A-7-261962, a light emitting element and a light receiving element are installed in a main body of a device and an infrared ray emitted from the light emitting element is reflected by hand or the like and received by the light receiving element by noncontact operation of a user (a player). Further, data of a plurality of patterns of dog characters and biorhythms of the dog characters are stored in a memory and accordingly, data of the dog characters in correspondence with a number of times of the noncontact operation and biorhythms of the day are selectively read from the memory and are displayed. Thereby, a character image also in correspondence with physical conditions of the dog character can be selectively displayed.

According to the conventional example disclosed in Japanese Unexamined Patent Publication No. JP-A-7-281819 a light emitting element and a light receiving element are installed in a main body of a device and an infrared ray from the light emitting element is reflected by hand or the like and received by the light receiving element by noncontact operation of a user by which a noncontact operation distance is detected. Further, a plurality of kinds of dog character data where motion of a dog is changed such as a looking-back dog or a paw-raising dog or the like and effective sound data are stored in a memory and accordingly, the dog character data are selectively read and displayed in correspondence with the noncontact operation distance and an effective sound thereof is emitted from a speaker. In this way, the character image in compliance with gesticular order by the hand of the user can selectively be displayed.

However, according to both of the above-described conventional examples, an instruction is issued to a character image by a unilateral order from the user and there has been no conventional example where a player responds to a call or a request from the character image.

SUMMARY OF THE INVENTION

The present invention has been devised in view of the above drawbacks and it is an object of the present invention to provide a simulation device for fostering a virtual creature where a player responds to a call or a request from a displayed virtual creature and conducts a treatment in correspondence thereto by which the virtual creature is disciplined or the virtual creature is grown and fostered.

Further, it is an object of the present invention to provide a simulation device for fostering a virtual creature where the virtual creature is grown and fostered in response to a call from a player.

According to a first aspect of the present invention, there is provided a simulation device for fostering a virtual creature where the following conditions are provided to achieve the above-described object.

That is, the present invention is constituted by:

(a) provision of inputting means for inputting a treatment for fostering a virtual creature;

(b) provision of a display unit for displaying the virtual creature;

(c) provision of a storing unit for storing control data for fostering the virtual creature;

(d) provision of a control unit whereby when the treatment for fostering the virtual creature is input from the inputting means, the control data corresponding to the treatment is read from the storing unit and a control for fostering the virtual creature is carried out based on the read control data;

(e) provision of detecting means for detecting a call from an external source;

(f) the control unit is provided with concealing means for randomly concealing a display of the virtual creature from the display unit; and (g) the control unit is provided with releasing means for unconcealing the virtual creature when the call from an external source is detected under a situation where the virtual creature is concealed.

According to a second aspect of the present invention, there is provided a simulation device for fostering the virtual creature having the following conditions.

That is, the present invention is constituted by:

(a) provision of inputting means for inputting a treatment for fostering a virtual creature:

(b) provision of a storing unit for storing control data for fostering the virtual creature;

(c) provision of a control unit whereby when the treatment for fostering the virtual creature is input from the inputting means, the control data corresponding to the treatment is read from the storing unit and a control for fostering the virtual creature is carried out based on the read control data;

(d) provision of detecting means for detecting a call from an external source;

(e) the control unit is provided with manifesting means for randomly manifesting an influencing creature effecting an adverse influence on growth of the virtual creature;

(f) the control unit is provided with repelling means for repelling the influencing creature when the call from an external source is detected under a situation where the influencing creature is manifested; and (g) further provision of a display unit for displaying the virtual creature and/or the influencing creature.

According to a third aspect of the present invention, there is provided a simulation device for fostering a virtual creature having the following conditions.

That is, the present invention is constituted by:

(a) provision of inputting means for inputting a treatment for fostering a virtual creature;

(b) provision of a storing unit for storing control data for fostering the virtual creature;

(c) provision of a control unit whereby when the treatment for fostering the virtual creature is input from the inputting means, the control data corresponding to the treatment is read from the storing unit and a control for fostering the virtual creature is carried out based on the read control data;

(d) provision of detecting means for detecting a call from an external source;

(e) the control unit is provided with operation means for having the virtual creature randomly conduct an action which is different from a normal action;

(f) the control unit is provided with rectifying means whereby when the call from an external source is detected under a situation where the virtual creature conducts the action which is different from the normal action, the virtual creature is rectified to carry out the normal action;

(g) further provision of a display unit for displaying the virtual creature.

Further, according to a fourth aspect of the present invention, there is provided a simulation device for fostering a virtual creature having the following conditions.

That is, the present invention is constituted by the following conditions in addition to the conditions according to the first through the third aspects.

That is, the present invention is constituted by:

(a) the storing unit stores a plurality of kinds of virtual creatures having different appearances;

(b) the control unit is provided with calling means whereby the virtual creature makes a call during a growth procedure;

(c) the inputting means is provided with a means for taking care of the virtual creature and a means for disciplining the virtual creature in response to the call from the virtual creature;

(d) the control unit is provided with selecting means for selecting one virtual creature from the stored plurality of kinds of virtual creatures in accordance with a degree of taking care of the virtual creature and a degree of disciplining the virtual creature during a growth procedure;

(e) the control unit is provided with changing means for changing the grown virtual creature into the selected virtual creature.

DETAILED DESCRIPTION OF THE PREFERRED EMBODIMENTS

An explanation will be given of an example of an embodiment of a simulation device for fostering a virtual creature according to the present invention in reference to the drawings.

Figure 1:
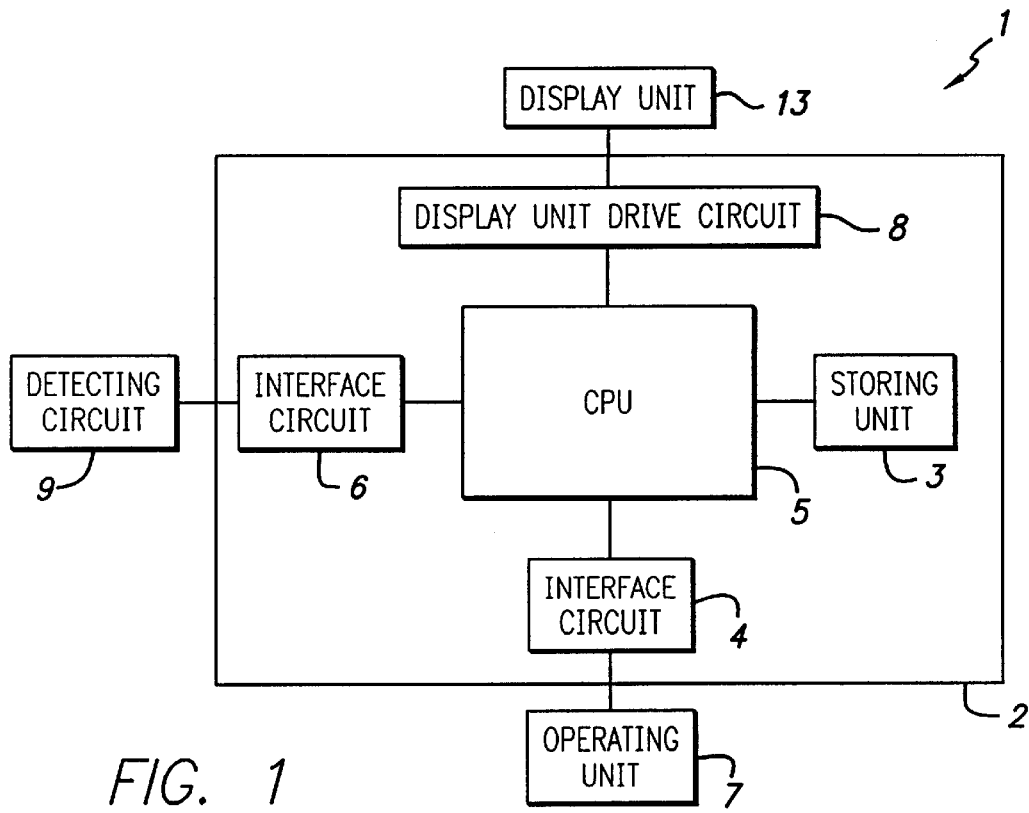
FIG. 1 is a block diagram of essential portions of the simulation device for fostering a virtual creature according to the present invention.
Figure 2:
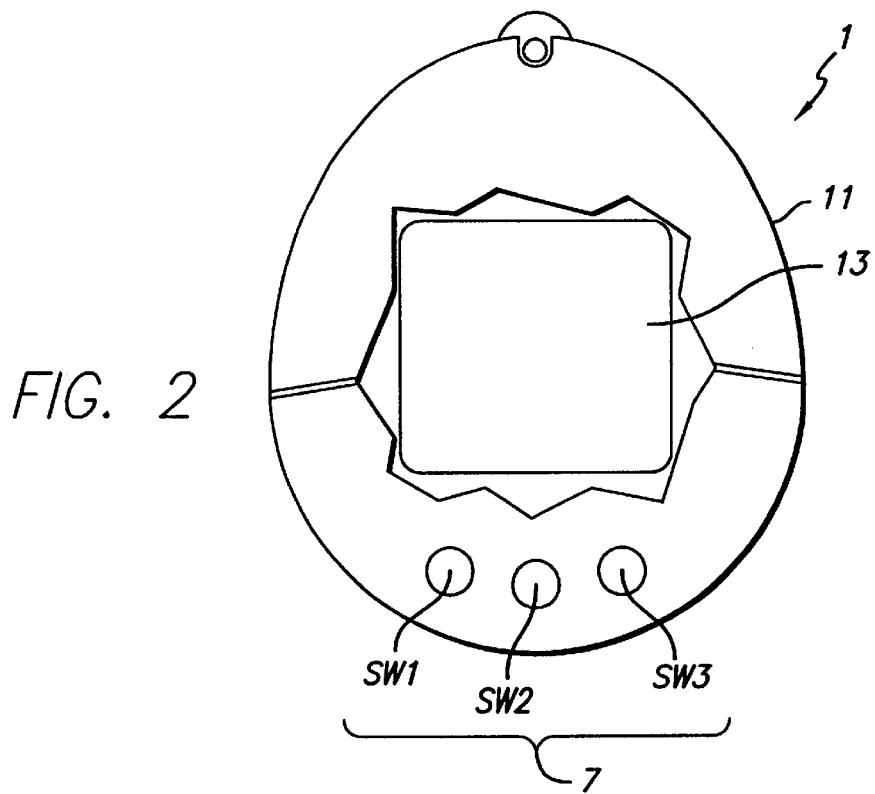
FIG. 2 is a front view of the simulation device for fostering a virtual creature according to the present invention.
Figure 3:
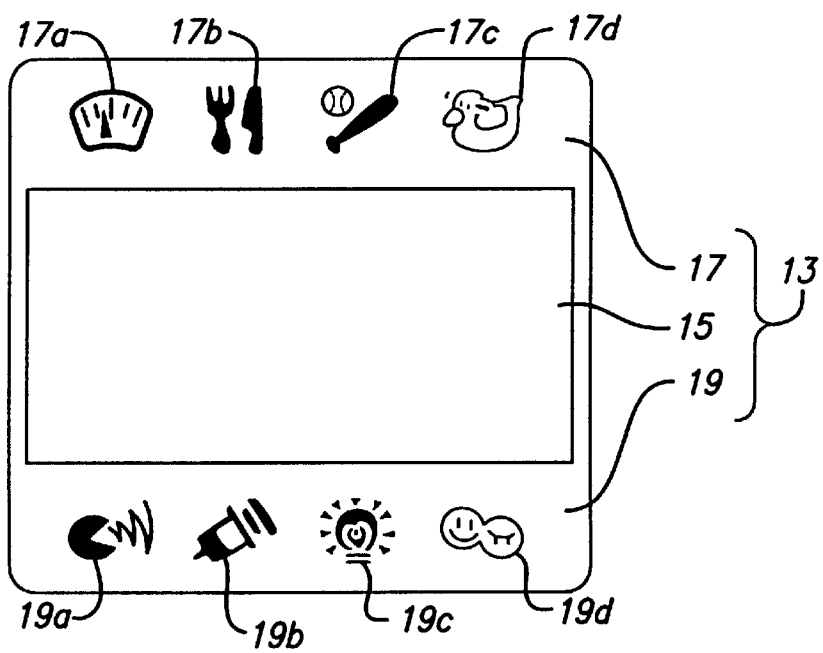
FIG. 3 is an explanatory view showing an example of a display unit of FIG. 2.

A simulation device 1 for fostering a virtual creature according to the first aspect of the present invention, is provided with mark display units 17 and 19 for displaying a plurality of kinds of treatments for fostering a virtual creature individually by marks as shown by FIG. 1 through FIG. 3. A plurality of marks of a check meter mark 17*a*, a food mark 17*b*, a game mark 17*c* and a rest room mark 17*d* are displayed in the mark display unit 17.

Further, a plurality of marks of a discipline mark 19*a*, a treatment mark 19*b*, an illumination mark 19*c* and a call mark 19*d* are displayed in the mark display unit 19.

Key switches SW1, SW2 and SW3 installed at the lower side of the mark display unit 19 are switches for conducting treatments in response to calls from the virtual creature, which constitute inputting means each for inputting a corresponding treatment by selecting a specific one from the plurality of marks.

The key switch SW1 is a switch for selectively displaying a desired mark from the mark display units 17 and 19 and at every time of pushing down the key switch SW1, the check meter mark 17*a*, the food mark 17*b*, the game mark 17*c*, the rest room mark 17*d*, the discipline mark 19*a*, the treatment mark 19*b* and the illumination mark 19*c* are switched and displayed in this order. The key switch SW2 is a switch for finally determining a selected mark and the key switch SW3 is a switch for canceling a displayed mark.

When, for example, the check meter mark 17*a* is selected by operating the key switches SW1, SW2 and SW3, respective values of age, weight, a humor parameter, a hungriness parameter and a degree of disciplining the virtual creature can be confirmed in a meter display. When the food mark 17*b* is selected, the virtual creature can be fed with food such as a sweet. When the game mark 17*c* is selected, a player can play a game with the virtual creature. When the rest room mark 17*d* is selected, if the virtual creature evacuates droppings, they can be cleaned by flushing water. When the discipline mark 19*a* is selected, discipline can be conducted in response to a selfish call from the virtual creature. Further, when the treatment mark 19*b* is selectively displayed, if there is an abnormality in the virtual creature, the virtual creature can be treated. When the illumination mark 19*c* is selected, if the virtual creature takes a sleep, illumination of a room can be put off.

Naturally, a treatment other than the above-described may be formed by a mark corresponding to the treatment and the mark may be input by selecting the key switches SW1, SW2 and SW3.

A device main body 11 includes a storing unit 3 for storing control data for fostering a virtual creature. The device includes a control unit (CPU) 5 where, when a treatment for fostering the virtual creature is input by operating the inputting means, control data in correspondence thereto is read from the storing unit 3 and a control for fostering the virtual creature is conducted based on the read control data. An image display unit 15 is installed at the front face of the device main body 11 and the image display unit 15 is a display unit for displaying the fostered virtual creature.

Further, the main body device 11 is provided with detecting means for detecting a call from an external source. The control unit 5 is provided with concealing means for randomly concealing a display of the virtual creature from the image display unit 15 and releasing means for unconcealing of the virtual creature when the call from an external source is detected under a situation where the virtual creature is concealed.

Pertinent sensors such as a sound sensor for detecting a sound or a human voice in a specific frequency band, a vibration sensor for detecting vibration applied to the main body device 11, a light sensor for detecting a specific light and the like are used for the detecting means.

When the simulation device 1 for fostering a virtual creature is small-sized, for example, when the device is formed compactly such that it is portable, ROM, EEPROM, SRAM or the like is fixedly installed as the above-described storing unit 3. Further, the storing unit 3 may be installed attachably and detachably in a style of a memory cassette.

When the simulation device 1 for fostering a virtual creature is large-sized, for example, when the device is integrated into a personal computer system, a pertinent record medium, for example, CD-ROM, CD-R, a magnetic disk, a photomagnetic disk, DVD or the like is attachably and detachably installed as the storing unit 3.

The simulation device 1 for fostering a virtual creature according to the second aspect of the present invention, includes mark display units 17 and 19 for displaying a plurality of kinds of treatments for fostering the virtual creature as shown by FIG. 1 through FIG. 3. A plurality of marks of the check meter mark 17*a,* the food mark 17*b,* the game mark 17*c* and the rest room mark 17*d* are displayed in the mark display unit 17.

Further, a plurality of marks of the discipline mark 19*a,* the treatment mark 19*b,* the illumination mark 19*c* and the call mark 19*d* are displayed in the mark display unit 19.

The key switches SW1, SW2 and SW3 installed at the lower side of the mark display unit 19 are switches for conducting treatments in response to calls from the virtual creature, which constitute inputting means each for inputting a corresponding treatment by selecting a specific mark from the plurality of marks.

The key switch SW1 is a switch for selecting and displaying a desired mark from the mark display units 17 and 19 and at every time of pushing down the key switch SW1, the check meter mark 17*a,* the food mark 17*b,* the game mark 17*c,* the rest room mark 17*d,* the discipline mark 19*a,* the treatment mark 19*b* and the illumination mark 19*c* are switched and displayed in this order. The key switch SW2 is a switch for determining a selected mark and the key switch SW3 is a switch for canceling a displayed mark.

When, for example, the check meter mark 17*a* is selected by operating the key switches SW1, SW2 and SW3, respective values of age, weight, a humor parameter, a hungriness parameter and a degree of disciplining the virtual creature can be confirmed in a meter display. When the food mark 17*b* is selected, the virtual creature can be fed with food such as a sweet. When the game mark 17*c* is selected, a player can play a game with the virtual creature. When the rest room mark 17*d* is selected, if the virtual creature evacuates droppings, they can be cleaned by flushing water. When the discipline mark 19*a* is selected, discipline can be conducted in response to a selfish call from the virtual creature. Further, when the treatment mark 19*b* is selectively displayed, if an abnormality is in the virtual creature, the virtual creature can be treated. If the illumination mark 19*c* is selected, when the virtual creature takes a sleep, illumination of a room can be put off.

Naturally, a treatment of a kind other than those of the above-described, may be formed by a mark and the mark may be input by selecting the key switches SW1, SW2 and SW3.

The device main body 11 includes the storing unit 3 for storing control data for fostering the virtual creature. The device includes a control unit 5 whereby, when a treatment for fostering the virtual creature is input by operating the inputting means, control data in correspondence therewith is read from the storing unit 3 and a control for fostering the virtual creature is carried out based on the control data. The image display unit 15 is installed at the front face of the device main body 11 and the image display unit 15 is a display unit for displaying the fostered virtual creature.

The main body device 11 includes detecting means for detecting a call from an external source. The control unit 5 includes manifesting means for randomly manifesting an influencing creature for effecting an adverse effect on the growth of the virtual creature and repelling means for repelling the influencing creature when the call from an external source is detected under a situation where the influencing creature is manifested. Further, the virtual creature and/or the influencing creature are displayed at the display unit installed at the front face of the device main body 11.

Pertinent sensors such as a sound sensor for detecting a sound or human voice at a specific frequency band, a vibration sensor for detecting vibration applied to the main body device 11, a light sensor for detecting a specific light and the like are used in the detecting means.

When the simulation device 1 for fostering a virtual creature is small-sized, for example, when the device is formed compactly such that it is portable, ROM, EEPROM, SRAM or the like is fixedly installed as the above-described storing unit 3. Further, the storing unit 3 may be installed attachably and detachably in a style of a memory cassette.

When the simulation device 1 for fostering a virtual creature is large-sized, for example, when the device is integrated into a personal computer system, the storing unit 3 may be installed attachably and detachably by a pertinent record medium, for example, CD-ROM, CD-R, a magnetic disk, a photomagnetic disk, DVD or the like.

Next, an explanation will be given of an embodiment of a simulation device for fostering a virtual creature according to the third aspect of the present invention.

As shown by FIG. 1 through FIG. 3, the simulation device for fostering a virtual creature according to the third aspect of the present invention, includes inputting means (key switches SW1, SW2 and SW3) for inputting treatments for fostering the virtual creature. For example, the player can take care of the virtual creature by preparing food, playing a game or putting off illumination by selecting some marks in the mark display units 17 and 19 by operating the key switches SW1, SW2 and SW3.

Further, the device main body includes the storing unit 3 for storing control data for fostering the virtual creature. The device also includes the control unit 5 whereby, when a treatment for fostering the virtual creature is input by operating the inputting means, control data in correspondence therewith is read from the storing unit 3 and a control for fostering the virtual creature is carried out based on the read control data.

The device also includes a detecting circuit 9 for detecting a call from an external source. The control unit 5 includes operating means for having the virtual creature conduct randomly an action that is different from a normal action and rectifying means whereby when a call from an external source is detected under a situation where the virtual creature conducts the action that is different from the normal action, the action is rectified into the normal action. The display unit 13 is installed at the front face of the device main body and the display unit 13 is a display unit for displaying the virtual creature.

When the simulation device 1 for fostering a virtual creature is small-sized, for example, when the device is formed compactly such that it is portable, ROM, EEPROM, SRAM or the like is fixedly installed as the above-described storing unit 3. Further, the storing unit 3 may be installed attachably and detachably in a style of a memory cassette.

When the simulation device 1 for fostering a virtual creature is large-sized, for example, when the device is integrated into a personal computer system, the storing unit 3 may be installed attachably and detachably by a pertinent record medium, for example, CD-ROM, CD-R, a magnetic disk, a photomagnetic disk, DVD or the like.

Next, an explanation will be given of an embodiment of a simulation device for fostering a virtual creature according to the fourth aspect of the present invention.

A plurality of kinds of virtual creatures having different appearances are stored in the storing unit 3. The control unit includes calling means whereby the virtual creature makes a call during a growth procedure. As the calling means, CPU 5 and a buzzer BZ1 or a speaker, or a winking light emitting element, or LED or a pertinent mark display unit or the like that is operated by an instruction of the CPU 5, are used.

Further, the key switches SW1, SW2 and SW3 are provided as inputting means for conducting a treatment in response to a call from the virtual creature. Pertinent switches or noncontact type switches using optical sensors or the like may be used other than push-down switches as the inputting means.

The inputting means includes a means for taking care of the virtual creature and a means for disciplining the virtual creature in response to a call from the virtual creature.

For example, when the food mark 17b is selected by operating the key switches SW1, SW2 and SW3, the virtual creature can be fed with food such as a sweet. When the rest room mark 17d is selected, if the virtual creature evacuates droppings, they can be cleaned by flushing water. In such a case, the key switches SW1, SW2 and SW3 function as the means for taking care of the virtual creature in response to the call from the virtual creature. When the discipline mark 19a is selected by operating the key switches SW1, SW2 and SW3, discipline can be conducted in response to a selfish call from the virtual creature. In that case, the key switches SW1, SW2 and SW3 function as a means for disciplining the virtual creature in response to the call from the virtual creature.

The control unit 5 includes a means for selecting one virtual creature from the stored plurality of kinds of virtual creatures in accordance with a degree of taking care of the virtual creature and a degree of disciplining the virtual creature during a growth procedure, and a means for changing the grown virtual creature into the selected virtual creature.

Next, an explanation will be given of an embodiment of the simulation device 1 for fostering a virtual creature according to the present invention in reference to the drawings.

Figure 4:
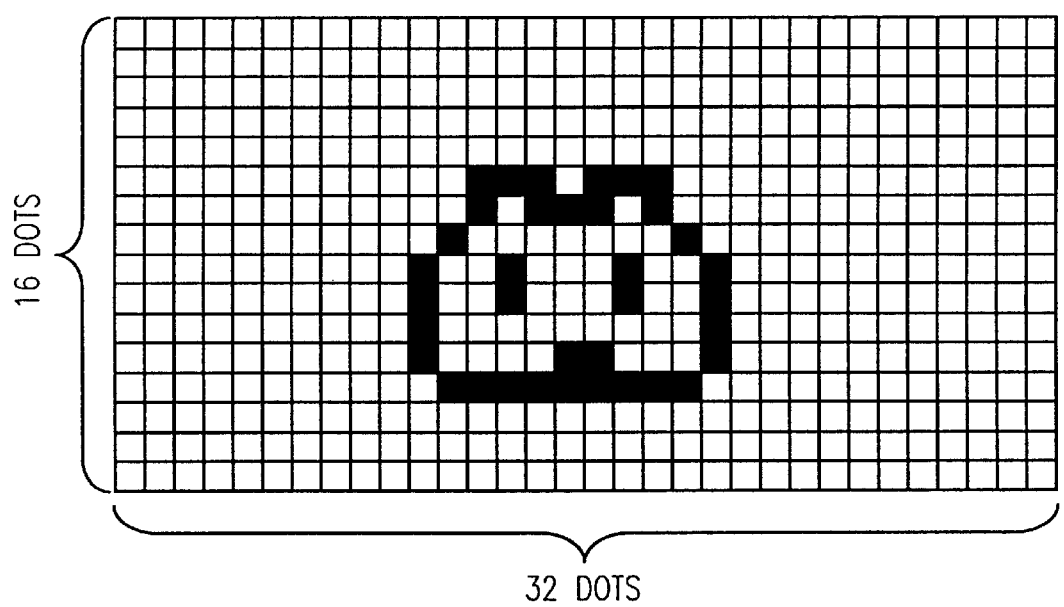
FIG. 4 is an explanatory view showing an example of a liquid crystal screen of the display unit of FIG. 2.

An explanation will first be given of the total constitution of the simulation device 1 for fostering a virtual creature in reference to FIG. 2 through FIG. 4.

As shown by FIG. 2, the device main body 11 is formed to be portable with an egg-like shape. The display unit 13 is installed at the central portion of the main body device 11 and the plurality of key switches SW1, SW2 and SW3 are arranged as an operating unit 7 at the lower side of the display unit 13.

The display unit 13 is constituted by an image display unit 15 for displaying character images of virtual creatures, the mark display unit 17 installed above the image display unit 15 and the mark display unit 19 installed below the image display unit 15. As shown by FIG. 4, the image display unit 15 is formed by a liquid crystal screen of vertical 16 dots×horizontal 32 dots.

A plurality of marks of the check meter mark 17a, the food mark 17b, the game mark 17c and the rest room mark 17d are displayed in the mark display unit 17. Further, a plurality of marks of the discipline mark 19a, the treatment mark 19b, the illumination mark 19c and the call mark 19d are displayed in the mark display unit 19.

The key switches SW1, SW2 and SW3 are switches for conducting a treatment in response to a call from a virtual creature, which constitute inputting means for inputting a corresponding treatment by selecting a specific mark from the plurality of marks.

The key switch SW1 is a switch for selecting and displaying a desired mark in the mark display units 17 and 19 and at every time of pushing down the key switch SW1, the check meter mark 17a, the food mark 17b, the game mark 17c, the rest room mark 17d, the discipline mark 19a, the treatment mark 19b and the illumination mark 19c are switched and displayed in this order. The key switch SW2 is a switch for determining a selected mark and the key switch SW3 is a switch for canceling a displayed mark.

The key switches SW1, SW2 and SW3 constituting the inputting means are provided with a function for taking care of a virtual creature and a function for disciplining the virtual creature in response to a call from the virtual creature.

When the check meter mark 17a is selectively displayed, respective values of age, weight, a humor parameter, a hungriness parameter and a degree of disciplining the virtual creature can be confirmed in a meter display. When the food mark 17b is selectively displayed, the virtual creature can be fed with food such as a sweet. Thereby, every time the virtual creature eats 1 cup of meal, the hungriness parameter is increased by +1. Also, every time the virtual creature eats 1 piece of sweet, the humor parameter is increased by +1. When the game mark 17c is selectively displayed, a player can play a game with the virtual creature. When, for example, the virtual creature wins by 3 times in 5 times of battles as a result of a game, the humor parameter is increased by +1. When the rest room mark 17d is selectively displayed, if the virtual creature evacuates droppings, they can be cleaned by flushing water. When the discipline mark 19a is selectively displayed, discipline can be conducted in response to a selfish call of the virtual creature. When the discipline mark 19a is selectively displayed, the selfishness can be corrected by praising the virtual creature. That is, according to the present invention, the discipline can be conducted and the selfishness of the virtual creature can be corrected by praising the virtual creature in response to the selfish call from the virtual creature.

When the treatment mark 19b is selectively displayed, if an abnormality is in the virtual creature, the virtual creature can be treated.

When the illumination mark 19c is selectively displayed, if the virtual creature takes a sleep, illumination of a room can be put off.

The call mark 19d is a mark for displaying a call from the virtual creature. The switch-on of the call mark 19d is controlled by CPU 5 and the call mark 19d constitutes a portion of a calling means by which the virtual creature makes a call during a growth procedure.

The device main body includes a clock and the key switches SW1, SW2 and SW3 are used for adjusting the time of the included clock.

A reset switch SW4 is installed on the back face of the device main body 11. The simulation of growing a virtual creature can be restored to an initial setting by operating the reset switch SW4.

Figure 5:
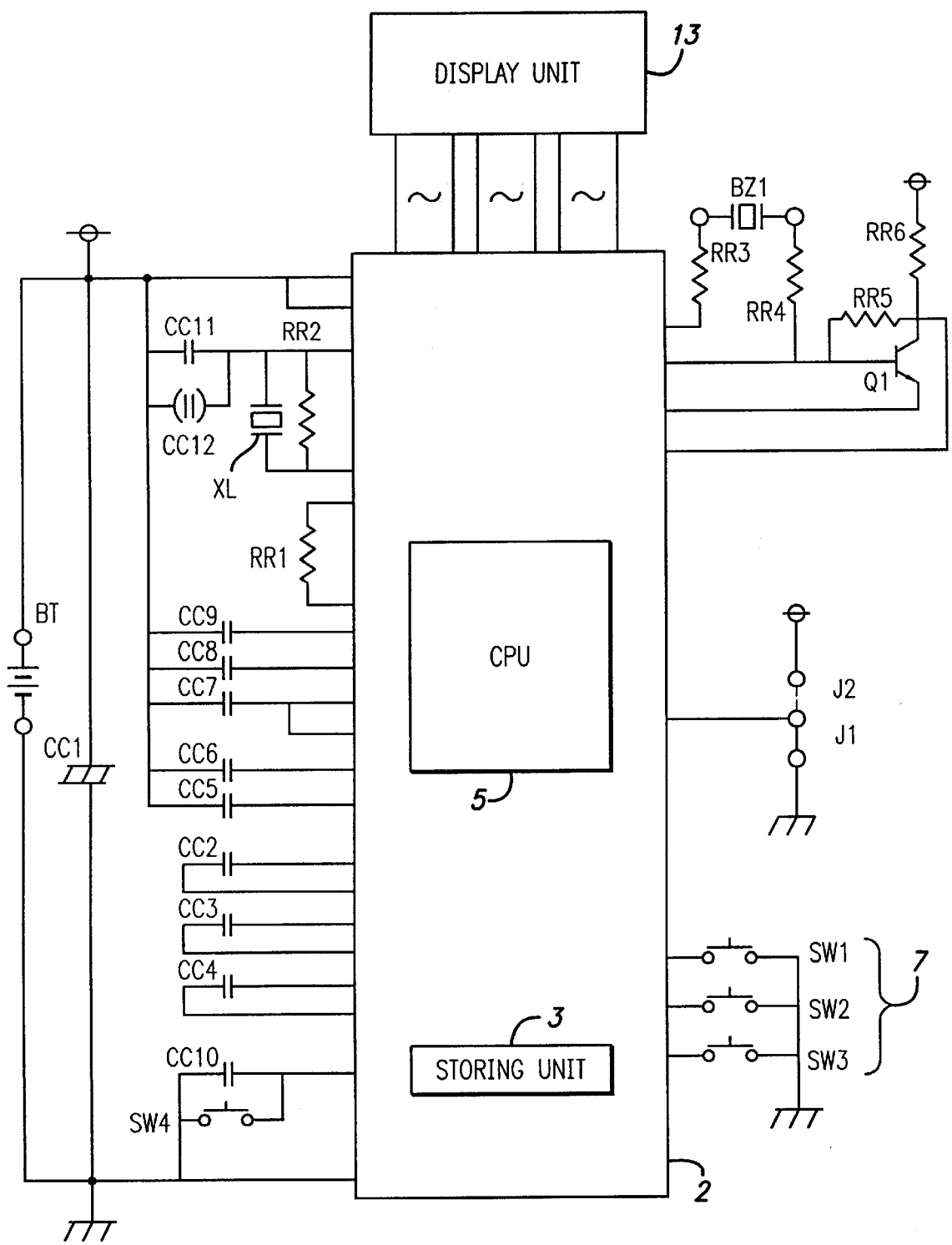
FIG. 5 is a circuit diagram of the simulation device for fostering a virtual creature in FIG. 2.

Next, an explanation will be given of the constitution of a circuit unit and a peripheral portion thereof integrated to the device main body 11 in reference to FIG. 1 and FIG. 5.

The above-described display unit 13 is connected to the control device 2 and the operating unit 7 is connected to a control device 2. The control device 2 is formed by one chip of an integrated circuit. The key switches SW1, SW2 and SW3 and the reset switch SW4 are connected to the control device 2. A battery BT, an oscillator XL, capacitors CC1 through CC12 and resistors RR1 through RR6 are connected to the control device 2.

A buzzer BZ1 is connected to the control device 2 via the resistors RR3 and RR4 and a transistor Q1 and the resistors RR5 and RR6 are connected thereto. The circuit unit including the buzzer BZ1 and the transistor Q1 constitutes the detecting circuit 9 for detecting a sound or a human voice in a specific frequency band. The buzzer BZ1 informs a call from the virtual creature by buzzing when the virtual creature makes the call and serves to function also as the calling means.

The control device 2 includes the storing unit 3 for storing software programs and various control data in respect of a growth simulation for fostering and growing a virtual creature, CPU 5 and work memories or the like of the CPU 5 for reading the software programs and the various control data stored in the storing unit 3 and executing various control treatments based on the software programs and the control data.

CPU 5 is connected to the storing unit 3 and is connected to the operating unit 7 via an interface circuit 4. Further, CPU 5 is connected to the detecting circuit 9 via an interface circuit 6 and is connected to the display unit 13 via a display drive circuit 8.

The control device 2 is provided with the calling means whereby the virtual creature makes a call during a growth procedure. Further, the control device 2 is provided with means for setting growth stages of 1 or 2 or more in accordance with growing the virtual creature, the storing unit 3 for storing a plurality of kinds of grown virtual creatures having different appearances at each of the growth stages and a means for selecting one grown virtual creature from the plurality of kinds of virtual creatures in consideration of contents of treatments in response to the calls during the growth procedure preceding the growth stage.

Further, the control device 2 is provided with a clock pulse forming circuit for forming clock pulses at a predetermined period of time based on oscillation pulses from the oscillator XL, a clock circuit for outputting clock information based on the clock pulses, a timer circuit for outputting timer information based on the clock pulses and the like.

Next, an explanation will be given of the operation of the embodiments according to the present invention.

An explanation will first be given of the main flow control in reference to FIG. 6. At step SP1, whether the reset switch SW4 is operated is determined and when the reset switch SW4 is operated, the operation proceeds to step SP3 and time setting is conducted by operating the key switches SW1, SW2 and SW3. The life time of the virtual creature is determined hereinafter based on this time. Accordingly, the virtual creature acts in accordance with real time. For example, a life pattern where the virtual creature starts acting by rising from bed at 9 o'clock in the morning and retires to bed at 8 o'clock in the evening, is set. An initial screen is successively displayed at step SP5. Here, it is assumed that an angel flies down from heaven and an image where, for example, a virtual creature having a shape of an egg falls down from heaven, is displayed and after a predetermined period of time the egg is cracked and a virtual creature of a character image KT1 in a first generation which is a new born baby of an angel, is born.

Next, treatments in respect of a first growth procedure is executed at step SP7. For example, a player takes care of the virtual creature by feeding a meal or a sweet by operating the key switches SW1, SW2 and SW3. Also, the player can conduct h;w rest room cleaning or treatment of an illness in response to a call from the virtual creature.

Next, at step SP9, when approximately 60 minutes have elapsed since the virtual creature of the baby character image KT1 was born, the virtual creature is changed into a virtual creature of a child character image KT2 and the operation proceeds to a second growth procedure. In the second growth procedure, when the virtual creature makes a call, the player takes care of the virtual creature in response to the call having a content necessary for growing the virtual creature similar to the above-described first growth procedure. Also, the player can conduct discipline in response to a call with a selfish content from the virtual creature.

Next, at step SP11, whether the virtual creature reaches a second growth stage is determined. When it is determined in step SP11 that the virtual creature does not reach the second growth stage, the operation returns to the step SP9 again and conducts treatments of the above-described second growth procedure. When it is determined in step SP11 that the virtual creature reaches the second growth stage, the operation proceeds to step SP13.

At step SP13, the player selects one virtual creature from a plurality of kinds of virtual creatures, that is, from virtual creatures of young character images KT3 and KT4.

For example, in the second growth procedure, if in the case where the calls are made from the virtual creature care is not taken 3 times or more in response to calls with contents necessary for growing the virtual creature and discipline is not made 2 times or more in response to calls with a selfish content from the virtual creature, a virtual creature of the young character image KT1 is selected and the virtual creature of the young character image KT1 is changed into a successive virtual creature and is grown thereafter.

Next, the operation proceeds to a third growth procedure at step SP15 and when a call is made from the virtual creature similar to the above-described second growth procedure, care can be taken in response to the call with a content necessary for growing the virtual creature and discipline can be made in response to a call with a selfish content from the virtual creature.

Successively, at step SP17, whether the virtual creature reaches a third growth stage is determined. When it is determined in step SP17 that the virtual creature does not reach the third growth stage, the operation returns to step SP15 again and the above-described treatments of the third growth procedure are conducted. Further, when it is determined in step SP17 that the virtual creature reaches the third growth stage, the operation proceeds to step SP19.

At step SP19, a virtual creature is selected from a plurality of kinds of virtual creatures, that is, from virtual creatures of adult character images KT5 through KT10 in consideration of contents of cares and disciplines in the above-described third growth procedure.

For example, in the third growth procedure, when in the case where calls are made from the virtual creature care is not taken 3 times or more in response to calls with a content necessary for growing the virtual creature and discipline is not made 6 times or more in response to calls with a selfish content from the virtual creature, a virtual creature of the adult character image KT5 is selected and the virtual creature of the adult character image KT5 is changed into a successive virtual creature and grown thereafter. Further, when the character image KT7 is smoothly grown, it changes into a character image KT11. Or, when a certain character image is grown, it changes into a character image KT12 with a predetermined probability.

Further, when the reset switch SW4 is not operated in step SP1, the operation proceeds to step SP2 and whether the virtual creature is at the first growth procedure is determined. When it is determined in step SP2, that the virtual creature is at the first growth procedure, the operation proceeds to step SP7 and treatments of the first growth procedure are conducted. When it is determined in step SP2 that the virtual creature is not at the first growth stage, the operation proceeds to step SP4 and whether the virtual creature is at the second growth procedure is determined. When it is determined in step SP4 that the virtual creature is at the second growth procedure, the operation proceeds to step SP9 and treatments of the second growth procedure are conducted. When it is determined in step SP4 that the virtual creature is not at the second growth procedure, that is, when it is determined that the virtual creature is at the third growth procedure, the operation proceeds to step SP15 and treatments of the third growth procedure are conducted.

Next, a detailed explanation will be given of the second growth procedure representatively among the respective growth procedures.

Figure 7:
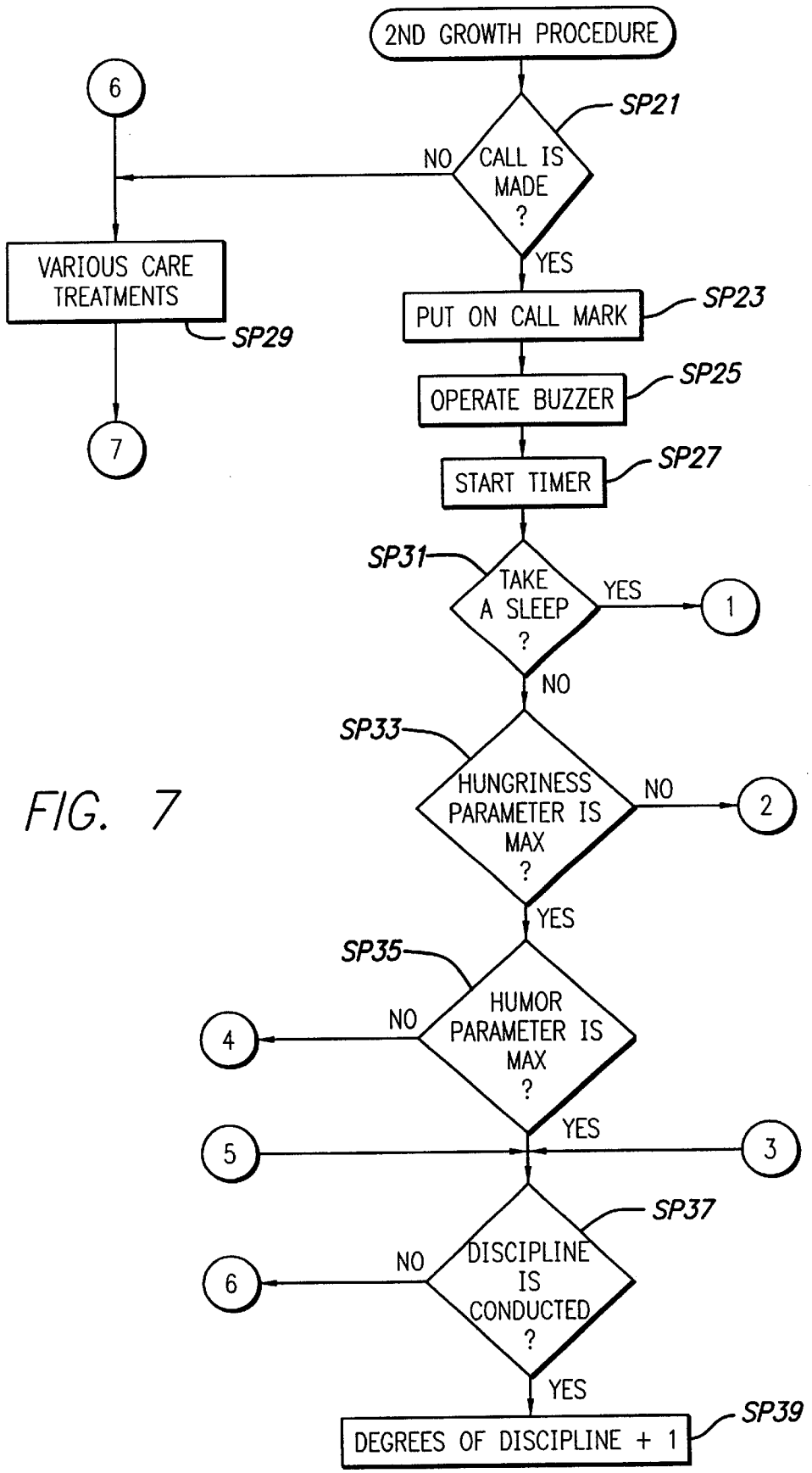
FIG. 7 is a flowchart showing a control treatment at a second growth procedure in the simulation device for fostering a virtual creature of FIG. 2.
Figure 11:
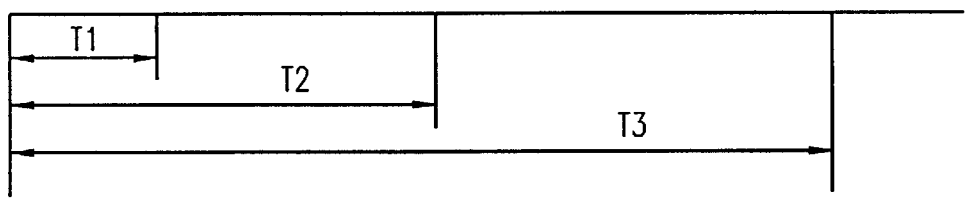
FIG. 11 is an explanatory view showing an input reception time in the simulation device for fostering a virtual creature of FIG. 2.

At step SP21 in FIG. 7, whether a call is made from the virtual creature is determined and when a call is made from the virtual creature, the operation proceeds to steps SP23 and SP25 where the call mark 19d is put on and at the same time the buzzer BZ1 is buzzed for a predetermined time T1 as shown by FIG. 11, for example, 3 seconds. Further, at the same time, the operation starts a timer at step SP27 and proceeds to step SP31.

Figure 8:
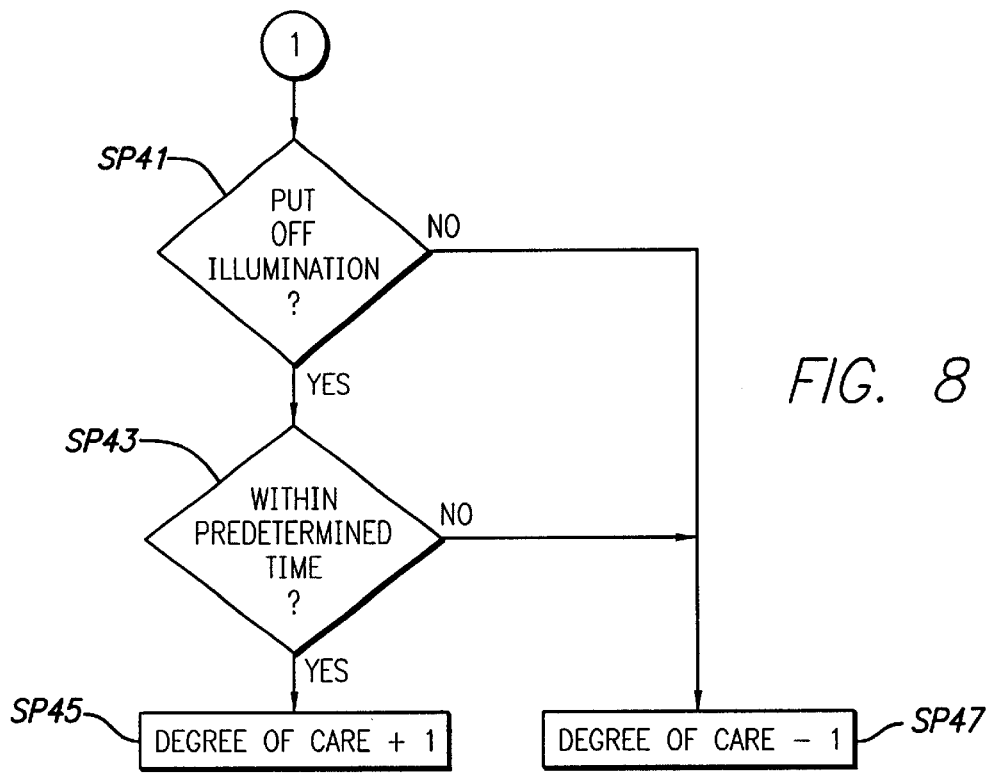
FIG. 8 is a flowchart showing a control treatment at the second growth procedure in the simulation device for fostering a virtual creature of FIG. 2.

Successively, at step SP31, whether the call from the virtual creature is for taking a sleep is determined. When it is determined in step SP31 that the call is made for taking a sleep, the operation proceeds to step SP41 of FIG. 8 via ①. At step SP41, whether a player puts off illumination by operating the key switches SW1, SW2 and SW3 is determined, and when the illumination is put off, the operation proceeds to step SP43 and whether the time is within a predetermined time is determined. When the illumination is put off within a predetermined time T3 as illustrated by FIG. 11 since the call was made from the virtual creature, for example, within 1 hour, a care has been made pertinently and the operation proceeds to step SP45 whereby a degree of care is increased by +1.

Conversely, when even if the call was made from the virtual creature, the care therefor has not been taken or when the illumination is put off after the predetermined time T3 has elapsed, for example, if 1 hour or more has elapsed, the care has not been taken pertinently and the operation proceeds to step SP47 from step SP41 or step SP43 whereby the degree of care is decreased by 1.

Figure 9:
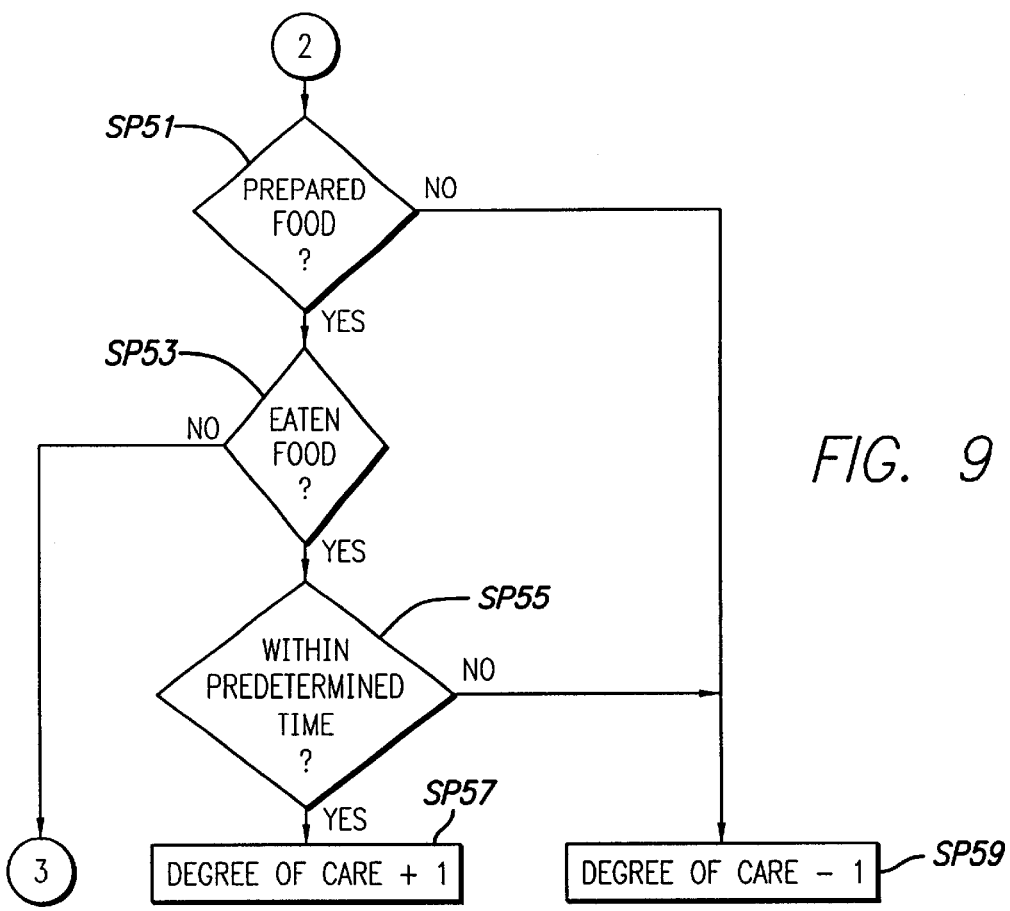
FIG. 9 is a flowchart showing a control treatment at the second growth procedure in the simulation device for fostering a virtual creature of FIG. 2.

Referring again to FIG. 7, when it is determined in step SP31 that the call is not for taking a sleep, the operation proceeds to step SP33. In step SP33, whether a value of the hungriness parameter of the virtual creature is MAX is determined and when the value of the hungriness parameter is not MAX, the operation proceeds to step SP51 of FIG. 9 via ②. At step SP51, whether the player has prepared food by operating the key switches SW1, SW2 and SW3 is determined and when food has been prepared, the operation proceeds to step SP53. At step SP53, whether the virtual creature has eaten the above-described prepared food is determined, and if the virtual creature has eaten food, the operation proceeds to step SP55. At step SP55, whether the time is within a predetermined time is determined. If the virtual creature has eaten food in a predetermined time T2 as illustrated by FIG. 11 since the call was made from the virtual creature, for example, within 15 minutes, the care has been taken pertinently and the operation proceeds to step SP57 whereby the degree of care is increased by +1.

Conversely, when even if the call was made from the virtual creature, the care therefor has not been taken at all, or if even in the case where the care of food has been taken, the virtual creature is fed with food after a predetermined time T2 has elapsed since the call was made from the virtual creature, for example, 15 minutes or more have elapsed, the care has not been taken pertinently and the operation proceeds to step SP59 from step SP51 or SP55 whereby the degree of care is decreased by 1.

Further, in the case where even if the player has prepared food in step SP51, the virtual creature does not eat food, the operation proceeds to step SP37 of FIG. 7 from step SP53 via ③.

Here, the player conducts an operation in respect of a discipline by determining that the virtual creature is selfish since the virtual creature has not eaten food even if the value of the hungriness parameter of the virtual creature is not MAX. That is, the player selectively displays the discipline mark 19a by operating the key switches SW1, SW2 and SW3 by which the player can conduct the discipline in respect of the virtual creature. In step SP37, whether the operation in respect of a discipline has been conducted is determined and when the operation in respect of a discipline has been conducted, the operation proceeds to step SP39 whereby a degree of discipline is increased by +1.

Figure 10:
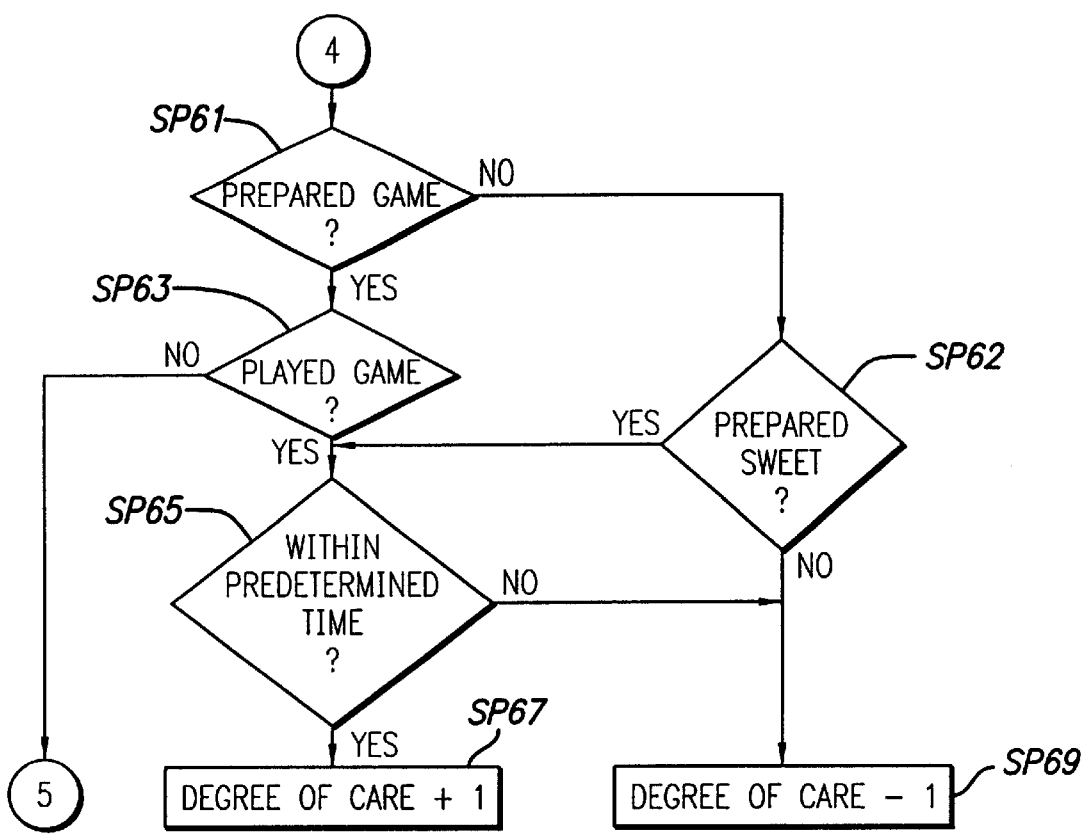
FIG. 10 is a flowchart showing a control treatment at the second growth procedure in the simulation device for fostering a virtual creature of FIG. 2.

As described above, at step SP33, whether the value of the hungriness parameter of the virtual creature is MAX is determined and when the value of the hungriness parameter is MAX, the operation proceeds to step SP35. At step SP35, whether a value of the humor parameter of the virtual creature is MAX is determined and when the value of the humor parameter is not MAX, the operation proceeds to step SP61 of FIG. 10 via ④. In step SP61, whether the player has prepared a game by operating the key switches SW1, SW2 and SW3 is determined and when the game has been prepared, the operation proceeds to step SP63. In step SP63, whether the virtual creature has played the game is determined, and when the virtual creature has played the game, the operation proceeds to step SP65. In step SP65, whether the time is within a predetermined time is determined. When the virtual creature has played the game within a predetermined time T2 as shown by FIG. 11 since a call was made from the virtual creature, for example, within 15 minutes, a care has been made pertinently and the operation proceeds to step SP67 whereby the degree of care is increased by +1.

When the game has not been prepared in step SP61, the operation proceeds to step SP62. At step SP62, whether the player has prepared a sweet by operating the key switches SW1, SW2 and SW3, is determined and when the player has prepared sweet, the operation proceeds to step SP65. In step SP65, whether the time is within the predetermined time is determined similar to the above-described operation. When a sweet has been prepared within the predetermined time T2 as illustrated by FIG. 11, since the call was made from the virtual creature, for example, within 15 minutes, the care has been taken pertinently and the operation proceeds to step SP67 whereby the degree of care is increased by +1.

Conversely, in the case where even if the call was made from the virtual creature, the care therefor has not been taken at all, or even if in the case where the care of the game has been taken, the game has not been played within the predetermined time T2 since the call was made from the virtual creature, for example, 15 minutes or more have elapsed, the care has not been taken pertinently and the operation proceeds to step SP69 from step SP61 or SP62 whereby the degree of care is decreased by 1.

Further, in the case where the virtual creature has not played the game at step SP63 even if the player has prepared the game, the operation proceeds to step SP37 of FIG. 7 from step SP63 via ⑤.

Here, the player conducts an operation in respect of a discipline by determining that the virtual creature is selfish since the virtual creature has not played the game even if the value of the humor parameter of the virtual creature was not MAX. That is, the player can conduct a discipline in respect of the virtual creature by selectively displaying the discipline mark 19a by operating the key switches SW1, SW2 and SW3. In step SP37, whether the operation in respect of a discipline has been conducted is determined and when the operation in respect of a discipline has been conducted, the operation proceeds to step SP39 whereby the degree of discipline is increased by +1.

Figure 6:
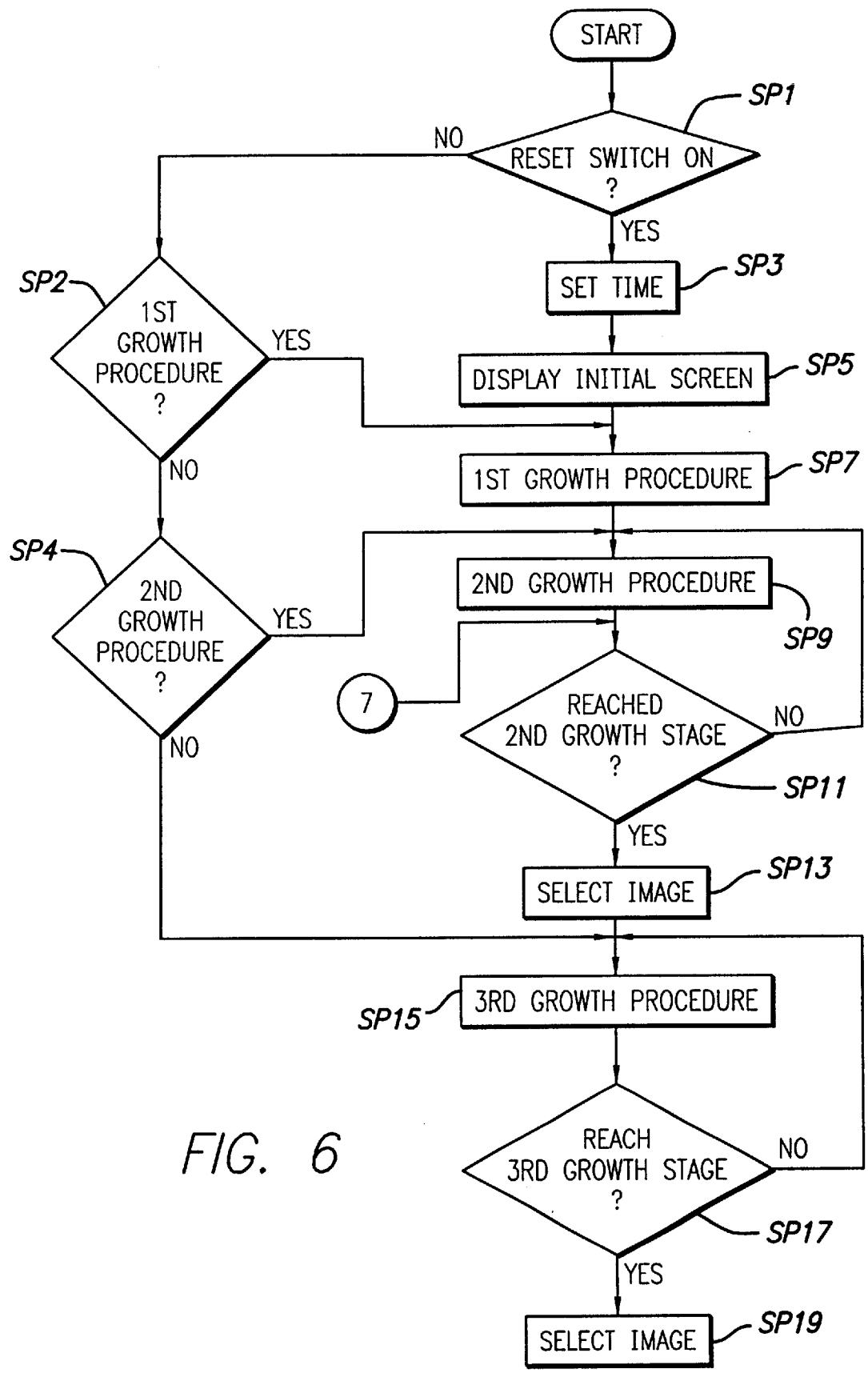
FIG. 6 is a flowchart showing a main control treatment in the simulation device for fostering a virtual creature of FIG. 2.

When a call has not been made from the virtual creature at step SP21 or when the operation in respect of a discipline is not conducted at step SP37, the operation proceeds to step SP29 where various care treatments are conducted and thereafter, the operation returns to step SP11 of FIG. 6 via ⑦.

Incidentally, the operations in other growth stages are the same as the operation of the second growth stage and a detailed explanation thereof will be omitted.

Figure 12:
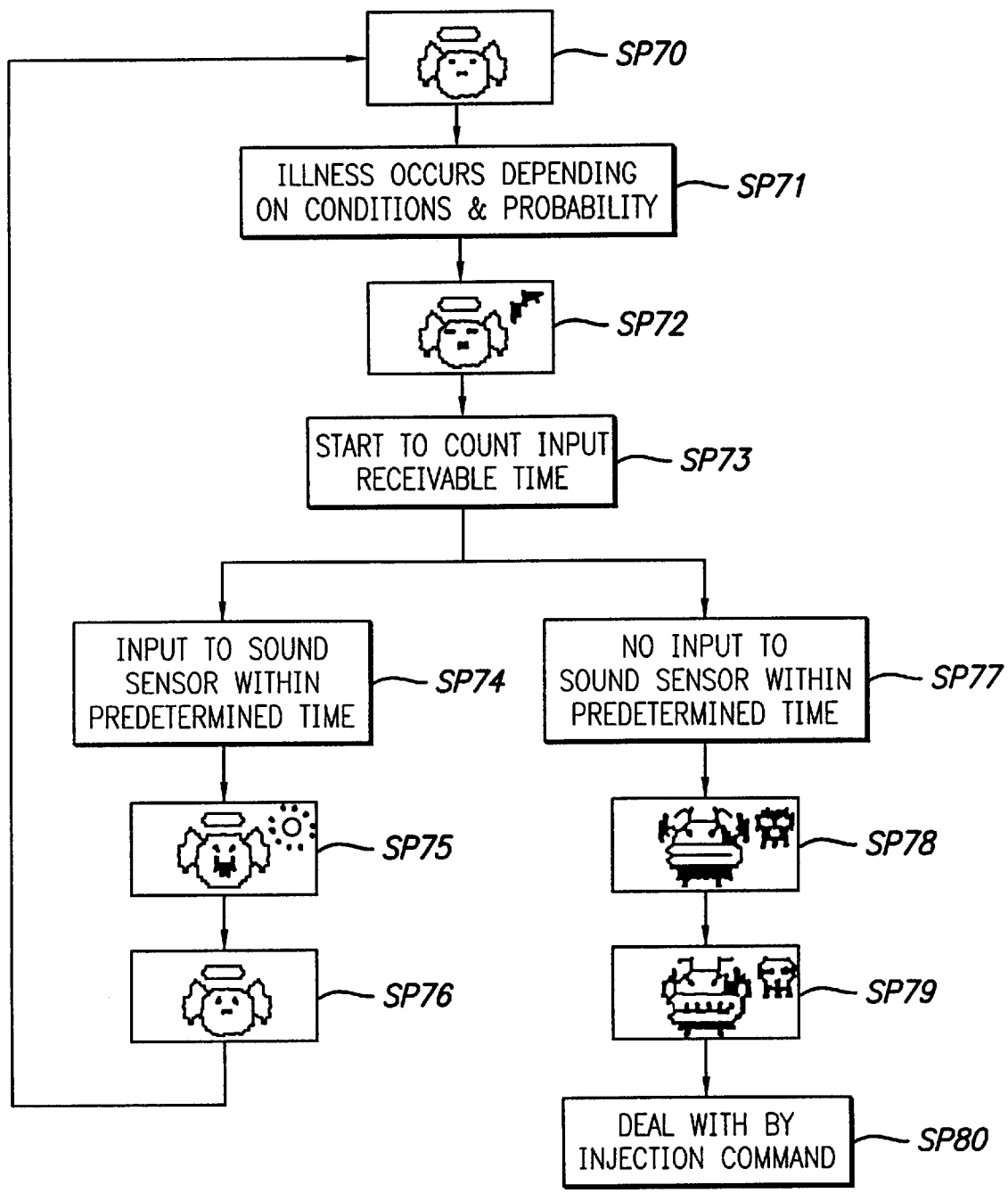
FIG. 12 is a flowchart showing the operation when an influencing creature is manifested.

Next, a detailed explanation will be given of the operation when an influencing creature is manifested in the growth stages in reference to FIG. 12.

CPU 5 conducts a control treatment for randomly manifesting an influencing creature effecting an adverse influence on the growth of the virtual creature and when an influencing creature of, for example, a satan or a bat is manifested by the CPU 5, an abnormality is caused in the virtual creature in accordance with conditions at that time and a certain probability (steps SP70 through SP72). At this moment, CPU 5 starts counting an input receivable time of a call from an external source by starting a timer (step SP73). When a call from an external source is made in a predetermined time, that is, when the detecting circuit 9 detects a human voice emitted by the player or a sound from knocking the main body device 11 (step SP74), the abnormality can be avoided and an image of the pleased virtual creature is displayed in the display unit 13 (steps SP75 and SP76).

Further, when a call from an external source is not made in the predetermined time, that is, when a human voice emitted by the player or a sound cannot be detected by the detecting circuit 9 (step SP77), the abnormality cannot be avoided and an image showing the virtual creature which becomes abnormal is displayed in the display unit 13 (steps SP78 and SP79). In this case, the player can treat the virtual creature by making a treatment by selectively displaying the treatment mark 19b (step SP80).

Further, the constitution where an influencing creature effecting an adverse effect on the growth of the virtual creature is randomly manifested and the influencing creature is expelled when the call from an external source is detected under a situation where the influencing creature is manifested as described above, is provided with pertinent variations.

For example, the constitution may be such that an influencing creature such as a bat snatching food when the virtual creature is eating food is manifested and the influencing creature is expelled when a call from an external source is detected.

Figure 13:
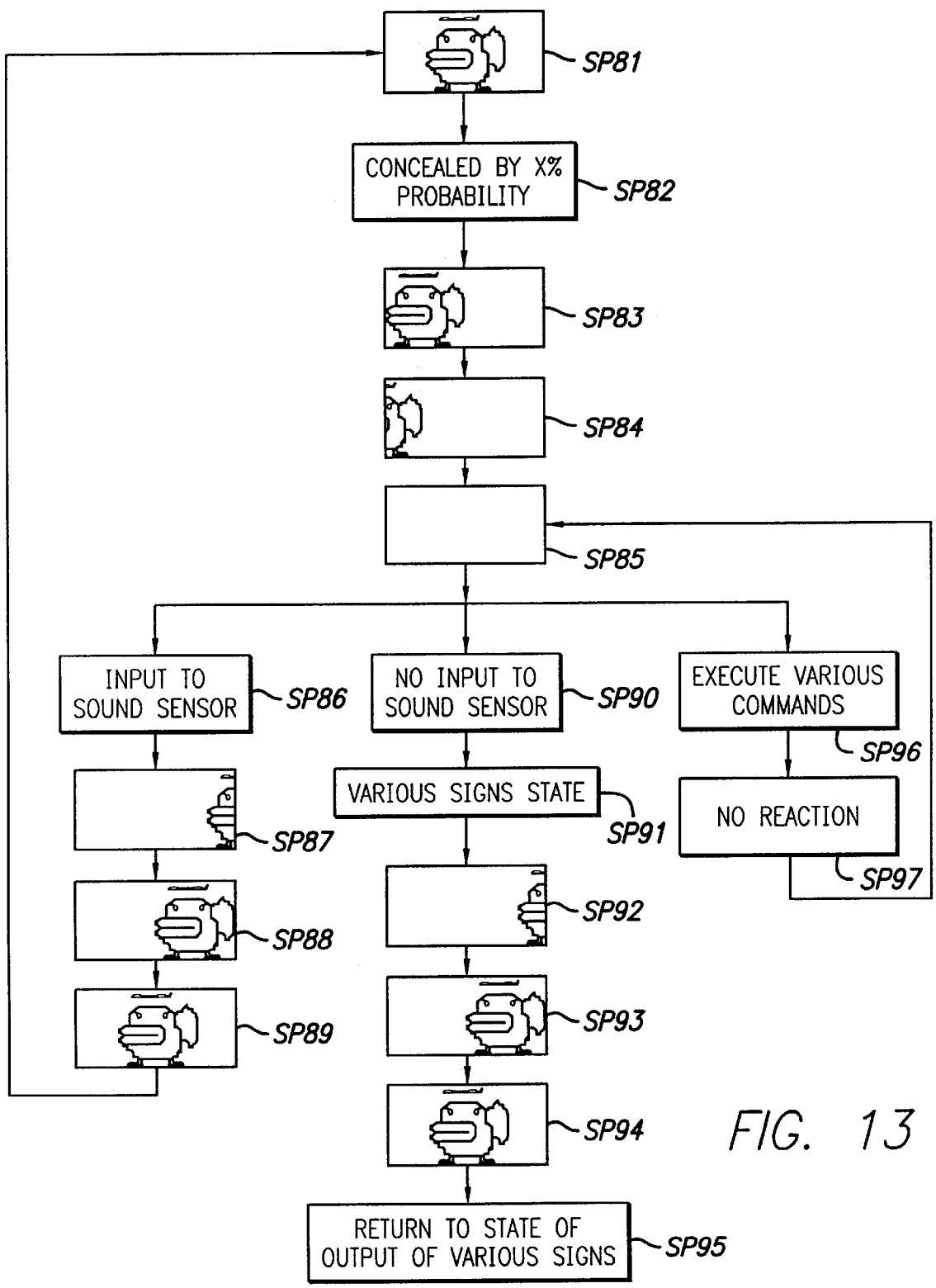
FIG. 13 is a flowchart showing the operation when a virtual creature conducts an action different from a normal action.
Figure 14:
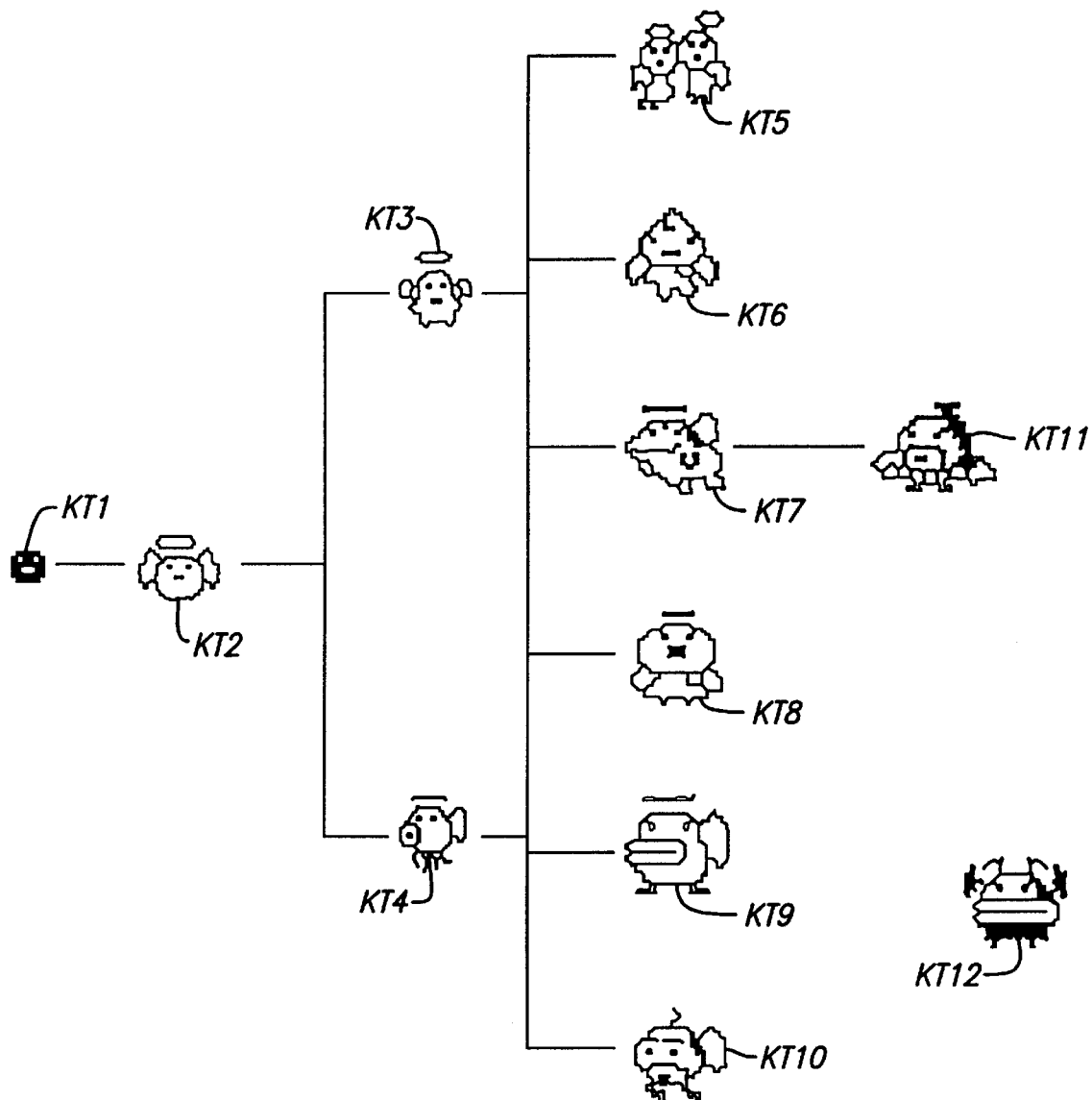
FIG. 14 is an explanatory view showing changes of virtual creatures which reach growth stages.

Next, an explanation will be given of the operation in the case where the virtual creature conducts an action which is different from an action at a normal time in the growth stages in reference to FIG. 13.

CPU 5 executes an operational control for having the virtual creature randomly conduct an action that is different from a normal action. For example, CPU 5 carried out a control whereby the displayed virtual creature is concealed from the screen and is brought out of existence, that is, a control for concealing the virtual creature (steps SP81 through SP85).

At this moment, when a call from an external source is made within a predetermined time, that is, when a human voice or a sound emitted by a player is detected by the detecting circuit 9, the virtual creature is gradually unconcealed and displayed (steps SP86 through SP89). Thereby, the virtual creature is rectified to perform a normal action.

Further, when the call from an external source has not been made within the predetermined time, that is, when a human voice emitted by the player cannot be detected by the detecting circuit 9 (step SP90), no change is caused in the display unit 13 even if various commands are input by operating the operating unit 7 (steps SP96 and SP97).

When a call is made from the virtual creature to the player under such a situation, the virtual creature per se is gradually manifested and makes a call to the player (steps SP91 through SP95).

Further, the constitution where the virtual creature is made to conduct randomly the action different from the normal action and the virtual creature is rectified to conduct the normal action when a call from an external source is detected under a situation where the virtual creature conducts the action different from the normal action as described above, is provided with further variations.

For example, when a call from an external source is detected under a situation where the virtual creature sits up late at night and plays even if the bedtime has expired, the constitution may be such that the virtual creature is put to bed and rectified to conduct the normal action.

Further, as another variation, when the virtual creature takes a doze in the midst of praying, and a call from an external source is detected under such a situation, the virtual creature may be shaken up and rectified to conduct the normal action.

As has been explained, according to the first aspect of the present invention, the inputting means for inputting a treatment for fostering a virtual creature and the storing unit for storing the control data for fostering the virtual creature are provided and when the treatment for fostering the virtual creature is input from the inputting means, the control data in correspondence thereto is read from the storing unit and a control for fostering the virtual creature is carried out based on the read control data. Further, the detecting means for detecting a call from an external source and the concealing means for randomly concealing the display of the virtual creature from the display unit are provided and when a call from an external source is detected under a situation where the virtual creature is concealed, the virtual creature is unconcealed and the virtual creature can be displayed as usual.

In this way, the concealed virtual creature can be displayed in an original shape by the call of actual human voice of the player and therefore, the invention achieves an effect capable of providing a tasteful simulation device for fostering the virtual creature.

Further, gentle mind for the virtual creature can be fostered when a player earnestly deals with the virtual creature as if he or she were raising an actual creature by which the invention achieves an effect capable of providing a simulation device for fostering a virtual creature that is suitable also in view of education.

According to the second aspect of the present invention, the inputting means for inputting a treatment for fostering a virtual creature and the storing unit for storing the control data for fostering the virtual creature are provided and when a treatment for fostering the virtual creature is input from the inputting means, the control data in correspondence thereto is read from the storing unit and a control for fostering the virtual creature is carried out based on the read control data. Further, the detecting means for detecting a call from an external source and the manifesting means for randomly manifesting an influencing creature effecting an adverse effect on the growth of the virtual creature are provided and when the call from an external source is detected under a situation where the influencing creature is manifested, the influencing creature can be expelled.

In this way, the influencing creature can be expelled by the call of an actual human voice of the player and accordingly, the invention achieves an effect capable of providing a tasteful simulation device for fostering a virtual creature.

Further, a gentle mind for the virtual creature can be fostered when a player earnestly deals with the virtual creature as if he or she were fostering an actual creature and the invention achieves an effect capable of providing a simulation device for fostering a virtual creature which is suitable also in view of education.

According to the third aspect of the present invention, the inputting means for inputting a treatment for fostering a virtual creature and the storing unit for storing the control data for fostering the virtual creature are provided and when the treatment for fostering the virtual creature is input from the inputting means, the control data in correspondence thereto is read from the storing unit and a control for fostering the virtual creature is conducted based on the read control data. Further, the detecting means for detecting a call from an external source and the operating means for having the virtual creature randomly conduct an action that is different from the normal action are provided and the invention achieves an effect where when a call from an external source is detected under a situation where the virtual creature conducts an action different from the normal action, the virtual creature may be rectified to conduct the normal action and the virtual creature can be fostered as if it were taken care of actually.

Further, the invention achieves an effect where a player can foster a virtual creature as if he or she were raising an actual creature whereby a tasteful simulation device for fostering a virtual creature can be provided.

Further, according to the fourth aspect of the present invention, a plurality of kinds of virtual creatures having different appearances are stored in the storing unit and the means for taking care of the virtual creature and the means for disciplining the virtual creature in response to a call from the virtual creature when the call is made from the virtual creature during a growth procedure are provided. Further, when the virtual creature is grown, one virtual creature is selected from the stored plurality of kinds of virtual creatures in accordance with the degree of taking care of the virtual creature and the degree of disciplining the virtual creature achieved during the growth procedure and the grown virtual creature is changed to the selected virtual creature.

In this way, the virtual creature is changed into an unexpected virtual creature in accordance with the degree of care and the degree of discipline of the player and therefore, the invention achieves an effect capable of providing a tasteful simulation device for fostering a virtual creature with no loss of interest.

There has been disclosed the simulation device for fostering a virtual creature by the above description. A skillful person can execute the present invention in cases other than the above-described preferable embodiments described with a purpose of exemplifying the present invention and with no purpose of limiting the present invention and the skillful person will understand that the present invention is not limited only by the following claims.

What is claimed is:

1. A simulation device for fostering a virtual creature comprising:

means for inputting a treatment for fostering a virtual creature;

a display unit for displaying the virtual creature;

a storing unit for storing control data for fostering the virtual creature;

a control unit whereby when the treatment is input from the inputting means, the control data corresponding to the treatment is read from the storing unit and a control for fostering the virtual creature is carried out based on the read control data;

detecting sensor detecting a call from an external source;

wherein the control unit is provided with concealing means for concealing, at a random timing, the virtual creature from the display unit; and wherein the control unit is provided with releasing means for unconcealing the virtual creature when the call from the external source is detected.

2. The simulation device according to claim 1 wherein the detecting sensor includes an environmental sensor.

3. The simulation device according to claim 1 wherein the detecting sensor includes a sound sensor.

4. The simulation device according to claim 3 wherein the sound sensor is configured to detect sound in a specific frequency band.

5. The simulation device according to claim 3 wherein the sound sensor is configured to detect a human voice.

6. The simulation device according to claim 1 wherein the detecting sensor includes a vibration sensor.

7. The simulation device according to claim 1 wherein the detecting sensor includes a light sensor.

8. The simulation device according to claim 1 wherein the simulation device further comprises a portable processing device, the portable processing device housing at least the means for inputting, the display unit, and the control unit.

9. A simulation device for fostering a virtual creature comprising:

means for inputting a treatment for fostering a virtual creature;

a storing unit for storing control data for fostering the virtual creature;

detecting sensor detecting a call from an external source;

a control unit whereby when the treatment is input from the inputting means, the control data corresponding to the treatment is read from the storing unit and a control for fostering the virtual creature is carried out based on the read control data, wherein the control unit is provided with manifesting means for manifesting, at a random timing, an influencing creature effecting an adverse influence on the growth of the virtual creature, and wherein the control unit is provided with repelling means for repelling the influencing creature when the call from an external source is detected; and a display unit for displaying the virtual creature and/or the influencing creature.

10. The simulation device according to claim 9 wherein the detecting sensor includes an environmental sensor.

11. The simulation device according to claim 9 wherein the simulation device further comprises a portable processing device, the portable processing device housing at least the means for inputting, the display unit, and the control unit.

12. A simulation device for fostering a virtual creature comprising:

means for inputting a treatment for fostering a virtual creature;

a storing unit for storing control data for fostering the virtual creature;

detecting sensor detecting a call from an external source;

a control unit whereby when the treatment is input from the inputting means, the control data corresponding to the treatment is read from the storing unit and a control for fostering the virtual creature is carried out based on the read control data, wherein the control unit is provided with operating means for having the virtual creature conduct an action, at a random timing, which is different from a normal action, and wherein the control unit is provided with rectifying means whereby when the call from an external source is detected under a situation where the virtual creature is carrying out the action which is different from the normal action, the virtual creature is rectified to carry out the normal action; and a display unit for displaying the virtual creature.

13. The simulation device for fostering a virtual creature according to any one of claims 11 through 12, wherein the storing unit stores a plurality of kinds of virtual creatures having different appearances;

wherein the control unit is provided with calling means whereby the virtual creature makes a call during a growth procedure;

wherein the inputting means is provided with a means for taking care of the virtual creature and a means for disciplining the virtual creature in response to the call from the virtual creature;

wherein the control unit is provided with selecting means for selecting one virtual creature from the stored plurality of kinds of virtual creatures in accordance with a degree of taking care of the virtual creature and a degree of disciplining the virtual creature during the growth procedure; and wherein the control unit is provided with changing means for changing the grown virtual creature into the selected one virtual creature.

14. The simulation device according to claim 12 wherein the detecting sensor includes an environmental sensor.

15. The simulation device according to claim 12 wherein the simulation device further comprises a portable processing device, the portable processing device housing at least the means for inputting the display unit and the control unit.

16. A processor controlled method for fostering a virtual creature, comprising the steps of:

receiving inputs corresponding to a treatment for fostering the virtual creature;

displaying the virtual creature;

when the treatment for fostering the virtual creature is inputted, reading stored control data corresponding to the treatment;

controlling the fostering of the virtual creature based on the read control data;

detecting a call from an external source;

concealing, at a random timing, the virtual creature from being displayed; and unconcealing the virtual creature when the call from the external source is detected.

17. A processor controlled method for fostering a virtual creature, comprising the steps of:

receiving inputs corresponding to a treatment for fostering the virtual creature;

detecting a call from an external source;

when the treatment for fostering the virtual creature is inputted, reading stored control data corresponding to the treatment;

controlling the fostering of the virtual creature based on the read control data;

manifesting, at a random timing, an influencing creature effecting an adverse influence on the growth of the virtual creature;

repelling the influencing creature when the call from the external source is detected; and displaying at least one of the virtual creature and the influencing creature.

18. A processor controlled method for fostering a virtual creature, comprising the steps of:

receiving inputs corresponding to a treatment for fostering the virtual creature;

detecting a call from an external source;

when the treatment for fostering the virtual creature is inputted, reading stored control data corresponding to the treatment;

controlling the fostering of the virtual creature based on the read control data;

causing the virtual creature to conduct, at a random timing, an action that is different from a normal action;

rectifying the virtual creature to carry out the normal action when the call from the external source is detected under a situation where the virtual creature is carrying out the action that is different from the normal action; and displaying the virtual creature.

19. The method according to any one of claims 16 through 18, further comprising the steps of:

storing a plurality of kinds of virtual creatures having different appearances;

causing the virtual creature to make a call during a growth procedure;

taking care of the virtual creature and disciplining the virtual creature according to inputs received in response to the call from the virtual creature;

selecting one virtual creature from the stored plurality of kinds of virtual creatures in accordance with a degree of taking care of the virtual creature and a degree of disciplining the virtual creature during the growth procedure; and changing the grown virtual creature into the selected one virtual creature.

20. A simulation device for fostering a virtual creature comprising:

an input device;

a display unit displaying the virtual creature;

a data storage unit storing control data for fostering the virtual creature;

a control unit receiving a signal when a treatment for the virtual creature treatment is designated using the input device, reading control data corresponding to the treatment from the data storage unit and providing a control signal for fostering the virtual creature based on the control data;

external source call detecting sensor that provides an external call source signal;

concealing circuit that operates to conceal the virtual creature from the display unit; and releasing circuit in the control unit providing an unconceal signal when an external call signal is received in the control unit.

* * * * *